(12) United States Patent
Ukhanov et al.

(10) Patent No.: US 9,482,691 B1
(45) Date of Patent: Nov. 1, 2016

(54) ATOMIC FORCE MICROSCOPY ACTIVE OPTICAL PROBE

(71) Applicants: Alexander A. Ukhanov, Albuquerque, NM (US); Gennady A. Smolyakov, Albuquerque, NM (US)

(72) Inventors: Alexander A. Ukhanov, Albuquerque, NM (US); Gennady A. Smolyakov, Albuquerque, NM (US)

(73) Assignee: ACTOPROBE, LLC, Albuquerque, NM (US)

( * ) Notice: Subject to any disclaimer, the term of this patent is extended or adjusted under 35 U.S.C. 154(b) by 15 days.

(21) Appl. No.: 14/991,421

(22) Filed: Jan. 8, 2016

Related U.S. Application Data

(60) Provisional application No. 62/282,529, filed on Aug. 4, 2015.

(51) Int. Cl.
*G01Q 60/22* (2010.01)

(52) U.S. Cl.
CPC .................................... *G01Q 60/22* (2013.01)

(58) Field of Classification Search
USPC .............................................. 850/24, 30, 33
See application file for complete search history.

(56) References Cited

U.S. PATENT DOCUMENTS

2007/0058686 A1* 3/2007 Capasso ................. B82Y 20/00
372/43.01

* cited by examiner

*Primary Examiner* — Kiet T Nguyen

(57) ABSTRACT

A new active optical Atomic Force Microscopy (AFM) probe integrating monolithically a semiconductor laser source, an AFM tip, and a photodetector into a robust, easy-to use single semiconductor chip to enable both conventional AFM measurements and optical imaging and spectroscopy at the nanoscale.

14 Claims, 8 Drawing Sheets

ATOMIC FORCE MICROSCOPY ACTIVE OPTICAL PROBE

CROSS REFERENCE TO RELATED APPLICATIONS

This application claims benefit and priority of U.S. provisional application Ser. No. 62/282,529 filed Aug. 4, 2015, the entire disclosure of which is incorporated herein by reference.

FIELD OF THE INVENTION

The present invention relates to AFM microscopy and near-field optical microscopy probes and, in particular, to an integrated AFM active optical probe capable of performing both conventional AFM measurements and optical imaging and spectroscopy at the nanoscale.

BACKGROUND OF THE INVENTION

Optical characterization at the nanoscale currently requires instruments such as NSOM (near-field scanning optical microscope), TERS (tip-enhanced Raman spectroscopy), or hybrid AFM (that includes a specialized far-field optical microscope).

Attempts at integrating atomic force microscopy and optical techniques have already been made and several products based on these schemes have found their way into the market. Commercially available, AFM tips with integrated waveguides (hollow tips) are used in conjunction with an external laser source [Celebrano 2009]. This high-cost approach suffers from inherent limitations in terms of optical resolution and light power that can be delivered. To achieve high lateral resolution the size of the near-field aperture needs be reduced, thus leading to an exponential decrease of optical power output. This approach has limited applications to near-field microscopy with ultimate resolution of about 50 nm, but is not appropriate for optical spectroscopy because of small power output.

Other approaches aimed at better integration of light source and AFM tip have generally involved either attaching a prefabricated light source (edge emitter, VCSEL, or LED) above a Si AFM cantilever probe (hybrid approach) [Bargiel 2006, Kingsley 2008] or fabrication of the light source directly on the AFM tip [Heisig 2000a, Heisig 2000b, Hoshino 2008, Hoshino 2009]. In these instances, the optical detectors were not integrated into the probes. The hybrid approach has only been shown to work in research labs and it is difficult to imagine how optical probes can be fabricated cost-effectively to make them affordable for a wider scientific community. In addition, VCSELs, commonly used in this approach, are limited in their optical output power.

In addition, single, integrated photodetectors have also been fabricated on AFM tips [An 2008]. The photodetector-only approach [An 2008] does not address the difficulties of aligning the light source onto the AFM tip, and the requirement to reduce detector size in order to achieve spatial resolution directly contradicts the requirement to have the largest possible detection area necessary to obtain high sensitivity levels for optical spectroscopy on nanoscale.

Lastly, an AFM tip with integrated LED light source and photodetector has been demonstrated [Sasaki 2000], but while the photodetector was monolithically fabricated into the probe, the light source (a GaAs LED) was simply glued onto the cantilever chip. This is insufficient to meet the requirement of high power, single wavelength operation.

SUMMARY OF THE INVENTION

In view of the above problems, it is therefore the object of the present invention to provide a novel class of probes for atomic force microscopy (AFM active optical probe—AAOP) by integrating a laser source and a photodetector monolithically into the AFM probe. The AAOPs are designed to be used in a conventional AFM and would enhance its functionality to include that of the above mentioned instruments (NSOM, TERS, hybrid AFM). As envisioned, these unique optical probes will perform the functions of conventional AFM probes and, in addition, will simultaneously provide information about optical and chemical properties of the sample at the nanoscale.

The AAOP concept is based on combining a diode laser and an AFM probe monolithically. The AAOP consists of a cantilever with the AFM probe mounted on a conventional Si chip. The AAOP is designed as an intra-cavity probe, that is, the AFM probe is part of the laser cavity.

The present invention envisions a method of fabricating a monolithic, integrated optical AFM probe. The most widely used probes for atomic force microscopy are fabricated using silicon technology. In contrast, the AAOPs are fabricated from GaAs, a semiconductor material suitable as the basis for optical device fabrication. The laser and detector functionality is enabled by an epitaxially grown structure. Edge-emitting laser diodes, light guides, and efficient photodetectors are fabricated by patterning the active region (epi-layer), while the AFM tip is fabricated from the GaAs substrate at the end of a cantilever formed from the epi-layers of the laser structure. The choice of GaAs is motivated by the large base of established fabrication technology, which allows for time- and cost-effective fabrication of the probes. Practice of the present invention can be easily extended to alternative III-V semiconductors such as InP, GaP, GaSb, and GaN to expand the available wavelength coverage from UV to visible and mid-infrared.

In an illustrative embodiment of the present invention, the laser cavity is defined by two distributed Bragg reflector (DBR) mirrors. The first laser mirror is a standard first-order DBR grating (period $\lambda/2n_{eff}$, where $\lambda$ is the laser wavelength and $n_{eff}$ is the effective refractive index of the GaAs waveguide) that ensures single longitudinal mode for the laser operation. The second laser mirror is a second-order DBR grating (period $\lambda/n_{eff}$) located at the end of the cantilever. It serves as a folding mirror that couples the light (an intracavity laser mode) vertically into the AFM tip fabricated from the laser substrate. Thus, the light generated by the laser is coupled into the surface mode of the GaAs probe (conic shape micro-prism) and transferred to the tip apex. The tip itself is a total internal reflection prism that plays the role of an output mirror, the third mirror, in the laser cavity. The GaAs micro-prism guides the laser light into the tip apex and generates a strong surface optical mode at the GaAs/air interface. It creates a high magnitude optical field highly localized at the apex of the AFM tip, sufficiently strong to enable effective excitation for nanoscale TERS.

In another illustrative embodiment of the present invention, the laser is a second-order distributed feedback (DFB) surface-emitting laser that employs its second-order waveguide grating to outcouple the laser light vertically into the AFM tip fabricated from the laser substrate. Again, the light generated by the laser is coupled into the surface mode of the GaAs probe (conic shape micro-prism) and transferred to the tip apex. Practice of the present invention can be easily extended to graded second-order DFB lasers for much more efficient power extraction in order to increase the optical power delivered to the GaAs probe. Graded second-order DFB lasers employ aperiodic gratings with symmetrically changing grating period to achieve a very significant enhancement of power extraction in vertical direction [Xu 2012].

In addition to unique imaging and spectroscopy capabilities, the AAOP technology provides an exciting opportunity for obtaining both space- and time-resolved optical/chemical information. Currently, a variety of techniques are used to measure ultrafast dynamics of surface adsorbates [Liang 1994, Frontiera 2011, Laaser 2013]. These methods, however, are limited in their spatial resolution to the far-field diffraction limit. TERS has the potential to overcome this limitation, but integration of external pulsed excitation source with TERS for time-resolved spectroscopy is very challenging [Klingsporn 2014, Pozzi 2014, Wickramasinghe 2014]. In contrast, the AAOP technology naturally provides the ultrafast time-resolved spectroscopy capability. The monolithically integrated semiconductor laser sources with specialized gain media with very broad gain spectrum, such as InAs quantum dots, offer mode-locking capabilities for sub-picosecond pulse generation [Huang 2001, Rafailov 2007]. The integration of ultrafast pulsed laser source into GaAs AFM probe will allow probing the nonlinear response of chemical systems and provide site-specific information about the molecular dynamics.

Practice of the present invention can be advantageous to provide high performance, low cost probes for atomic force microscopy with enhanced functionality to include that of NSOM, TERS, or hybrid AFM. The AAOP with its integrated light source and detector has the potential to outperform the above-mentioned technologies for optical characterization at the nanoscale.

The high refractive index of GaAs accounts for a resolution increase compared to hybrid AFM that employs an optical microscope in the far field: the resolution increases by the factor of the refractive index of GaAs (~3.6). Since light source and detector are integrated into the probe, the difficulty of focusing the optical microscope on the correct surface area does not apply. This also puts the detector very close to the sample, which results in increased sensitivity.

The high refractive index of GaAs also accounts for an advantage of the AAOP compared to NSOM. The AAOP is operated with an aperture large enough, so that the frequency is just above the waveguide cut-off. Since NSOM uses glass with lower refractive index, it has to be operated below cut-off frequency to achieve the same resolution. This translates into a dramatic loss in transmission through the aperture (several orders of magnitude), which leads to low signal-to-noise ratio and thereby low sensitivity.

The AAOP can also be operated apertureless using surface plasmons, as an optical antenna [Vedantam 2009, Novotny 2011]. TERS works similarly, but its performance is challenged by scattered light from the far field, leading to a large background signal. In the AAOP the light is supplied through the tip, hence there is no scattered light and therefore significantly reduced background. Furthermore, the difficulties associated with laser alignment onto the tip and with imaging the signal onto a detector or spectrometer are avoided with the AAOP.

The enhanced functionality can be achieved at a price much smaller than the cost of purchasing a dedicated NSOM or TERS instrument. The AAOP fabrication technology essentially combines two well-developed technologies: AFM probe fabrication and edge-emitting semiconductor laser fabrication. The fabrication process avoids hybridization and should allow for high-volume manufacturing, resulting in a cost-effective, affordable product that can be adopted for use by all current owners of atomic force microscopes. The instrumentation in addition to an existing AFM would just require laser driver and detection electronics. The cost advantage compared to a NSOM instrument would be on the order of 10-100 times, and AAOP has the potential to outperform NSOM as described above. The low cost and simplicity of use of AAOPs will open up new important opportunities for the application of near-field optical microscopy for research and engineering in academia and industry.

These and other advantages of the present invention will become more readily apparent from the following detailed description taken with the following drawings.

DETAILED DESCRIPTION OF THE INVENTION

The AAOP concept is based on combining a diode laser and an AFM probe monolithically. Some preferred embodiments of the invention will be described below in detail based on the drawings.

Embodiment 1

Figure 1A:
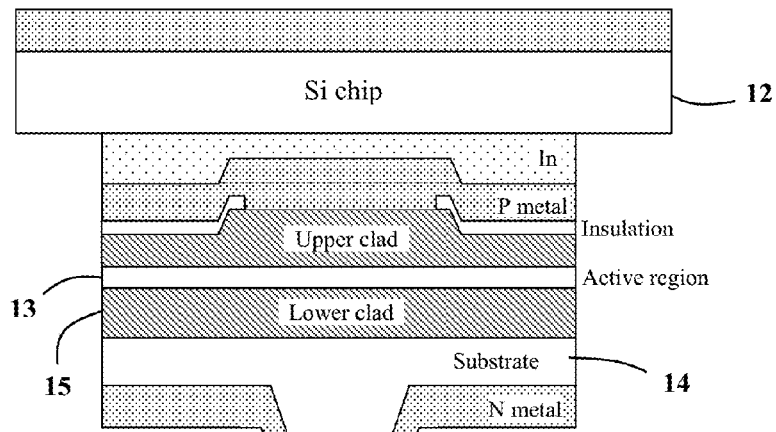
FIGS. 1A, 1B, and 1C are schematic illustrations of Embodiment 1 of an AFM active optical probe according to the invention, showing its configuration: (A) cross-sectional view, (B) side view, and (C) bottom view.
Figure 1B:
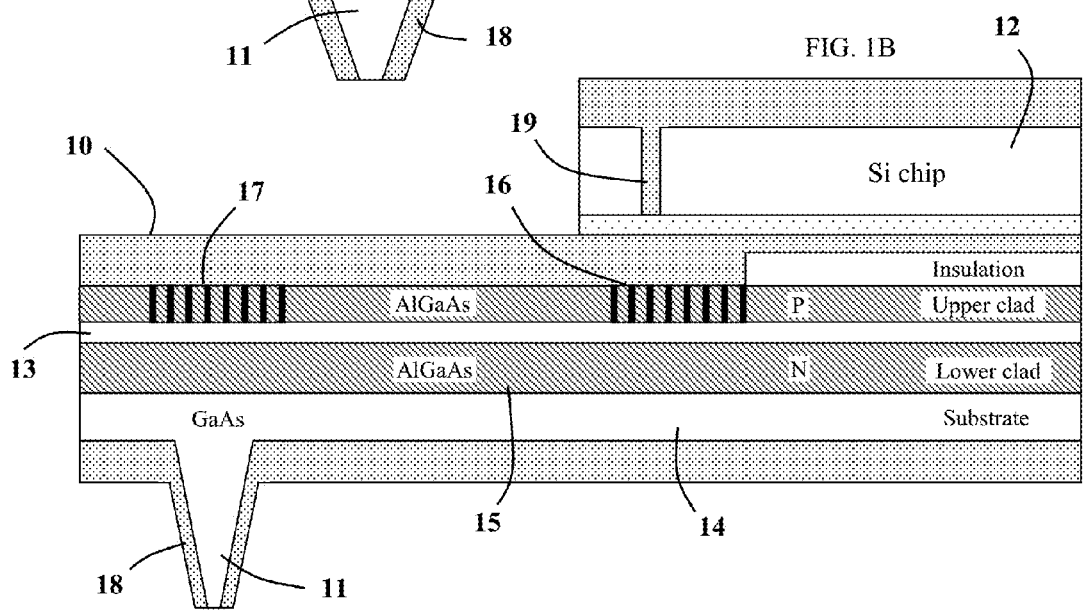
Figure 1C:
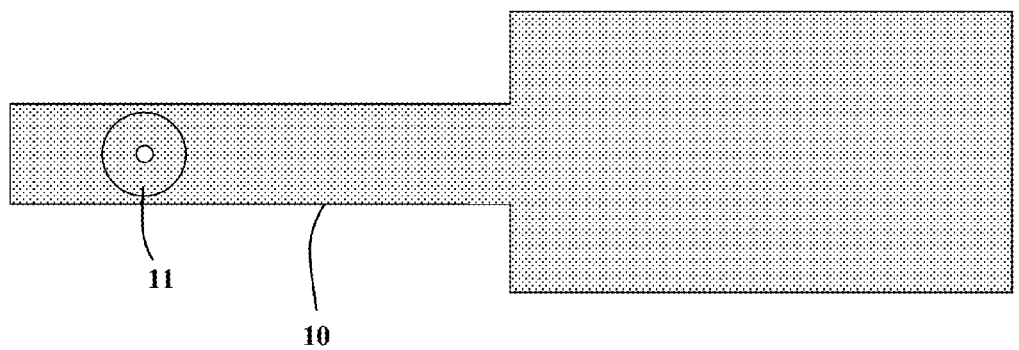
Figure 2:
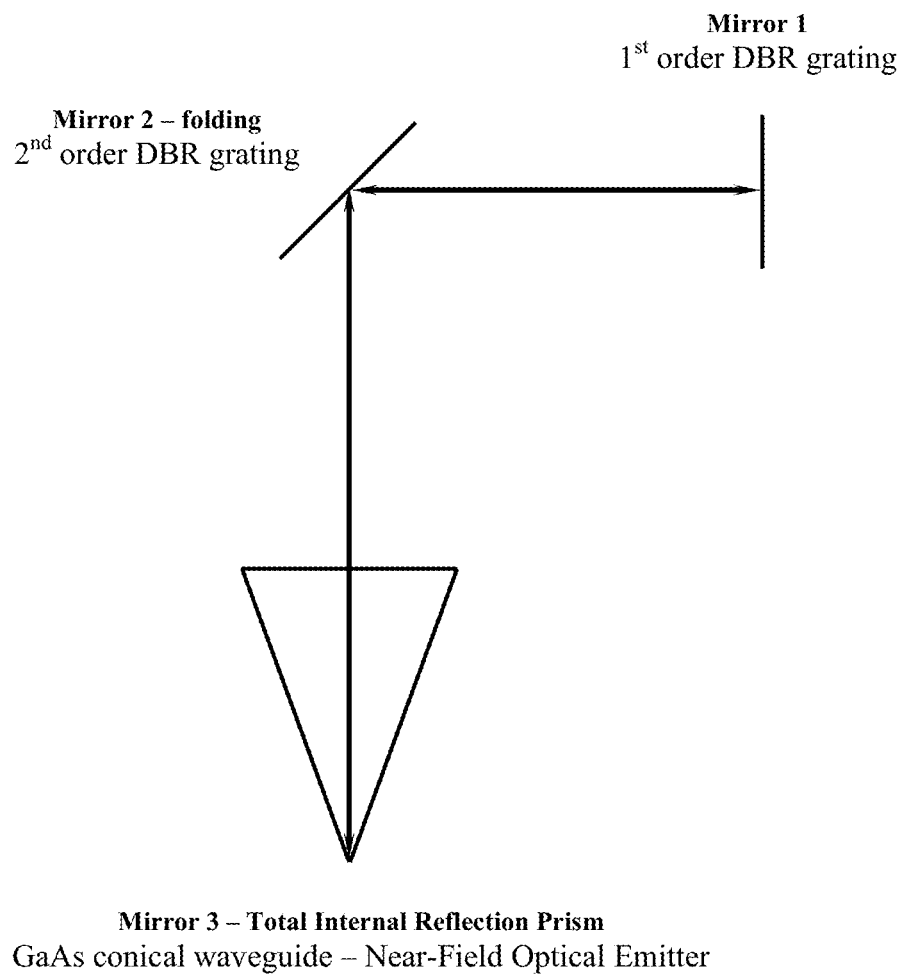
FIG. 2 is a schematic illustration of the AAOP optical scheme according to Embodiment 1 of the invention.

The envisioned AFM Active Optical Probe (AAOP) is shown in FIGS. 1A, 1B, and 1C. In FIG. 1A, we present a cross-sectional view of the probe. In FIG. 1B, a side view is shown, and in FIG. 1C a bottom view is shown. The AAOP consists of a cantilever 10 with the AFM probe tip 11 mounted on a conventional Si chip 12 (3.4 mm×1.6 mm×0.3 mm). The AAOP is designed as an intra-cavity probe, i.e. the AFM probe is part of the laser cavity as shown in an equivalent optical schematic of the device in FIG. 2. This increases laser light coupling into the optical near field at the apex of the AFM probe by a factor of 10,000 [Partovi 1999]. The AAOP is a very efficient optical near-field nano-emitter.

The most widely used probes for atomic force microscopy are fabricated using silicon technology. In contrast, the AAOPs are fabricated from GaAs, a semiconductor material suitable as the basis for optical device fabrication. The laser and detector functionality is enabled by an epitaxially grown structure. Ridge-waveguide laser diode and efficient photo-detectors are fabricated by patterning the active region 13 (epi-layer), while the AFM tip 11 is fabricated from the GaAs substrate 14 at the end of a cantilever 10 formed from the epi-layers of the laser structure. The cantilever with the AFM probe is fabricated from an epitaxial laser structure MBE-grown on a GaAs substrate. The laser 15 is designed as an electrically pumped edge emitting laser (ridge waveguide), and the epitaxial structure is a typical quantum well edge emitter structure with 10-nm wide $Ga_{0.85}In_{0.15}As$ quantum wells imbedded in a GaAs waveguide and surrounded by doped $Al_{0.7}Ga_{0.3}As$ cladding layers, one of them is n-doped and the other p-doped. The structure also includes an $Al_{0.95}Ga_{0.05}As$ etch stop layer to facilitate substrate removal in order to fabricate a cantilever that consists only of the ~5 µm thick epitaxial laser structure. The choice of GaAs is motivated by the large base of established fabrication technology, which allows for time- and cost-effective fabrication of the probes. Practice of the present invention can be easily extended to alternative III-V semiconductors such as InP, GaP, GaSb, and GaN to expand the available wavelength coverage from UV to visible and mid-infrared.

The first laser mirror, mirror #1, is a standard first-order DBR grating 16 (period $\lambda/2n_{eff}$, where $\lambda$ is the laser wavelength and $n_{eff}$ is the effective refractive index of the GaAs waveguide) that ensures single longitudinal mode for the laser operation. Light generated by the laser is coupled into the surface mode of the GaAs probe (conic shape micro-prism) and transferred to the tip apex as follows: at the end of the cantilever and inside the laser cavity, mirror #2, a second-order DBR grating 17 (period $\lambda/n_{eff}$), couples the light (an intracavity laser mode) vertically into the AFM tip. It serves as a folding mirror.

The tip 11 itself is a Total Internal Reflection Prism (TIRP) and plays the role of an output mirror, mirror #3, in the laser cavity. The GaAs micro-prism guides the laser light into the tip apex and generates a strong surface optical mode at the GaAs/air interface. It creates a high magnitude optical field highly localized at the apex of the AFM tip, sufficiently strong to enable effective excitation for nano-scale Raman Spectroscopy-Tip Enhanced Raman Spectroscopy (TERS). Finite Difference Time Domain (FDTD) simulations predict that for a bare GaAs micro-prism the near-field light ($\lambda$=980 nm) can be focused to a spot size of 160 nm in diameter and with about 30 mW power. By coating the micro-prism with a thin layer of gold 18 (50 nm), the spot size decreases to dimensions less than 50 nm but the power reduces by a factor of about 1000. Depending on application, the probe can be apertureless or have a nanometer-size aperture at the apex. In the case of the apertureless probe, a surface plasmon mode is excited in the Au coating, providing a very strong optical field at the apex of the AFM tip. In the case of the probe with a nanometer-size aperture, the tip operates as an optical waveguide below cut-off frequency and optical radiation is transmitted through the aperture.

Figure 3A:
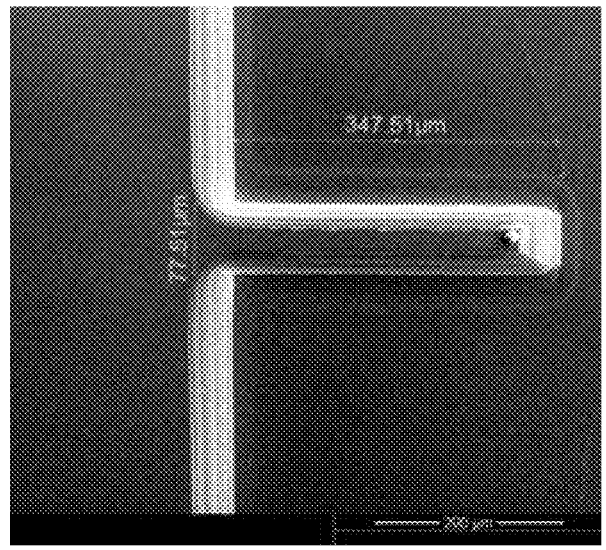
FIG. 3A is top view of a GaAs AFM cantilever with the tip fabricated using wet chemical etching. The cantilever has not been separated from the substrate.
Figure 3B:
FIG. 3B is a close-up view of the tip tilted 25°. The base of the tip is about 10 μm×10 μm. The tip radius achieved here is on the order of 50 nm.
Figure 4:
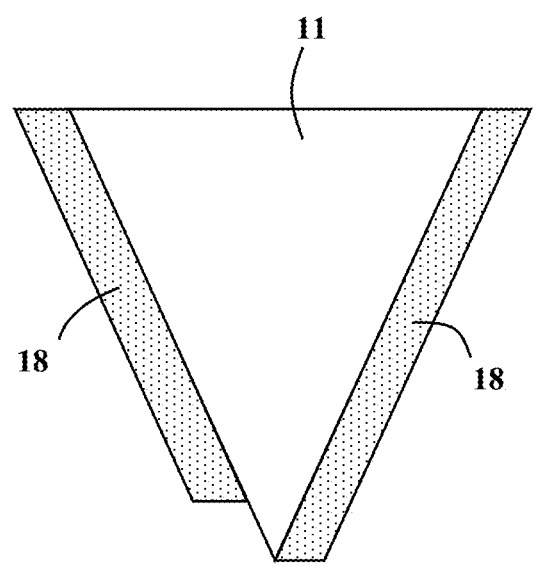
FIG. 4 is a schematic illustration of an asymmetric probe tip concept.

The fabricated GaAs probe tip 11 had a conical geometry with 40° angle and a base of 10-12 µm (FIG. 3A, FIG. 3B). This geometry makes this probe an optical antenna that focuses laser radiation into a diffraction limited spot of 280 nm diameter for a laser wavelength of 1 µm as a result of total internal reflection in the GaAs conical waveguide with no cutoff losses. Additional metallization of the conical waveguide with gold of 80-nm thickness will provide additional focusing of the light to about 40-20 nm in diameter [Neacsu 2007] because of the surface plasmon effect. Systematic design of probe tip using FDTD simulations revealed that introduction of well-controlled asymmetry in the probe tip configuration combined with asymmetry in illumination of probe tip and light polarization should enable substantially improved resolution of the near-field probe up to ~$\lambda$/20-$\lambda$/30. An example of such asymmetric probe tip is a 4-sided high-index (n~3.5) pyramid (GaAs or Si) conformally covered with 80 nm-thick Au, except for the last 20 nm of one side of the pyramid close to the tip that is left uncoated. FIG. 4 shows a cross section of such a probe 11 asymmetrically coated with a layer of gold 18.

For conventional TERS, the far-field optical power is on the order of 20-100 mW. Since with the AAOP, the light can be coupled to the near field more efficiently, substantially less optical power is necessary to obtain the same electric field strength at the tip apex. We estimate that an optical power in the range of 0.5-10 mW is sufficient, and can easily be provided by semiconductor lasers.

The main difference of the AAOP from other AFM probes is that the AAOP is designed to do optical nano-scale spectroscopy together with AFM imaging. Front- and back-sides of the chip are metallized in the appropriate places to make electrical contact to laser/detector structure and to provide high reflectivity for optical displacement monitoring used to read out tip deflection for AFM imaging. Electrical contact can be realized by means of a hole 19 etched through the Si chip 12 and filled with metal.

This optical AFM probe utilizes the diode laser operating in pulsed mode under direct modulation of the injection current with low duty-cycle (~1-5%) to avoid heating of the AFM tip and imaging artifacts related to heating.

The AFM cantilever dimensions (see FIG. 1) are chosen to provide performance similar to that of conventional Si AFM probes and accommodate the laser diode cavity and photodector structures. Both the laser and photodetector epitaxial structures are identical but differ in terms of the biasing: the laser diode junction is biased in forward direction (electrons and holes recombine and create light); the reverse bias applied to the photodetector creates a depletion region where incident light will create electron/hole pairs, producing a photocurrent proportional to light intensity.

Figure 5:
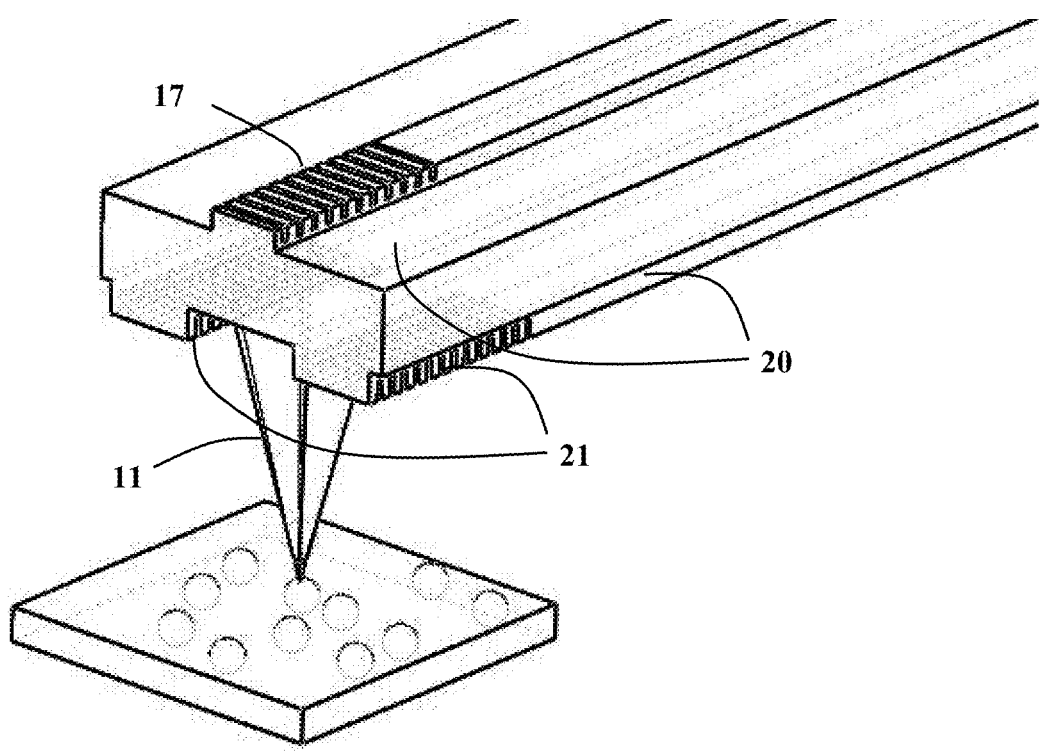
FIG. 5 is a 3-D illustration of the AAOP concept.

The AFM tip 11 is located directly underneath the second-order DBR grating 17. The light radiates from the apex of the tip that forms a point source. The tip is located between two photodetectors 20 that consist of stripes similar to the laser ridge waveguide but reverse-biased (FIG. 5). The large detection area of about 50×100 µm² each provides high light collection efficiency. This point source, which is a source of light scattered from the sample under investigation, are less than 10 µm away from the detector. This close proximity of the source and the detectors also provides high collection efficiency for scattered near-field radiation. Second-order DBR gratings 21 fabricated on top of the photodetector structures couple the light scattered from the sample into the ridge waveguide photodetectors. By applying a voltage the effective refractive index can be slightly altered [Codlren & Corzine 1995], thereby tuning the DBR grating for a specific Raman shift. By sweeping the voltage, this structure can work as a Raman spectrometer without moving parts.

Embodiment 2

Figure 6:
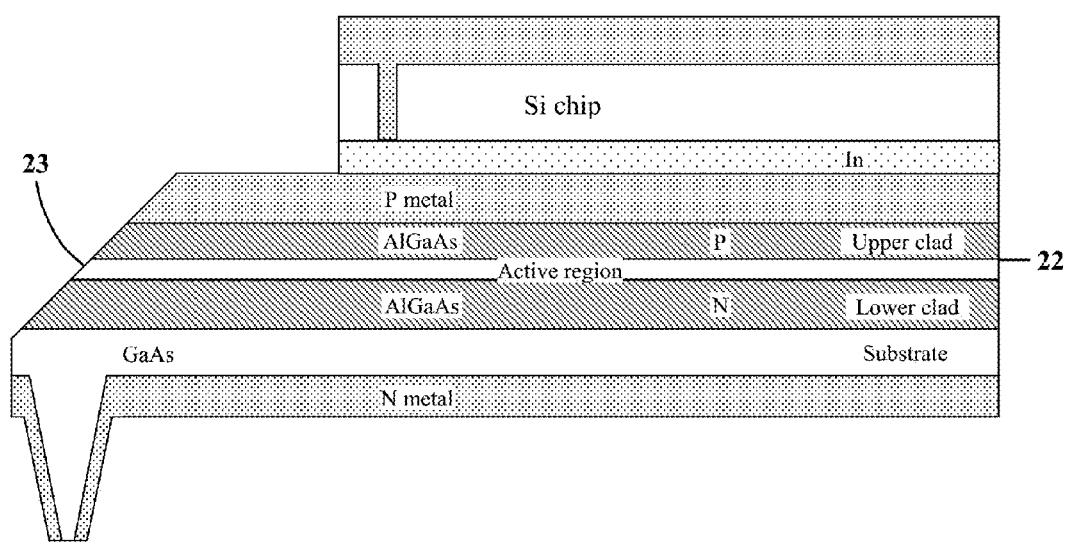
FIG. 6 is a schematic illustration of Embodiment 2 of an AFM active optical probe according to the invention.

In another embodiment of the present invention the mirrors #1 and #2 of the laser cavity can be in the form of facets obtained by cleaving or etching the laser wafer or by applying Focused Ion Beam (FIB) in proper directions (FIG. 6). For example, mirror #1 22 can be fabricated by cleaving or etching the wafer perpendicular to the epitaxial layers. Mirror #2 (the folding mirror) 23 can be fabricated using FIB applied in such a way as to create a flat surface at 45° with respect to the wafer surface.

Embodiment 3

Figure 7:
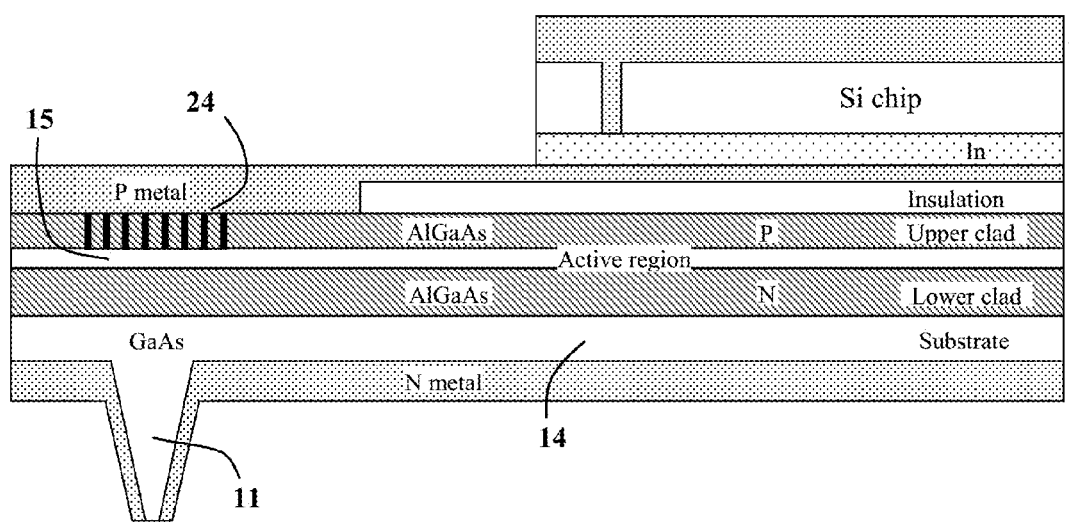
FIG. 7 is a schematic illustration of Embodiment 3 of an AFM active optical probe according to the invention.

In yet another embodiment of the present invention, the laser 15 is a second-order distributed feedback (DFB) surface-emitting laser that employs its second-order waveguide grating 24 to outcouple the laser light vertically into the AFM tip 11 fabricated from the laser substrate 14 (FIG. 7).

Again, the light generated by the laser is coupled into the surface mode of the GaAs probe tip (conic shape microprism) and transferred to the tip apex. Practice of the present invention can be easily extended to graded second-order DFB lasers for much more efficient power extraction in order to increase the optical power delivered to the GaAs probe tip. Graded second-order DFB lasers employ aperiodic gratings with symmetrically changing grating period to achieve a very significant enhancement of power extraction in vertical direction [Xu 2012].

Embodiment 4

Figure 8:
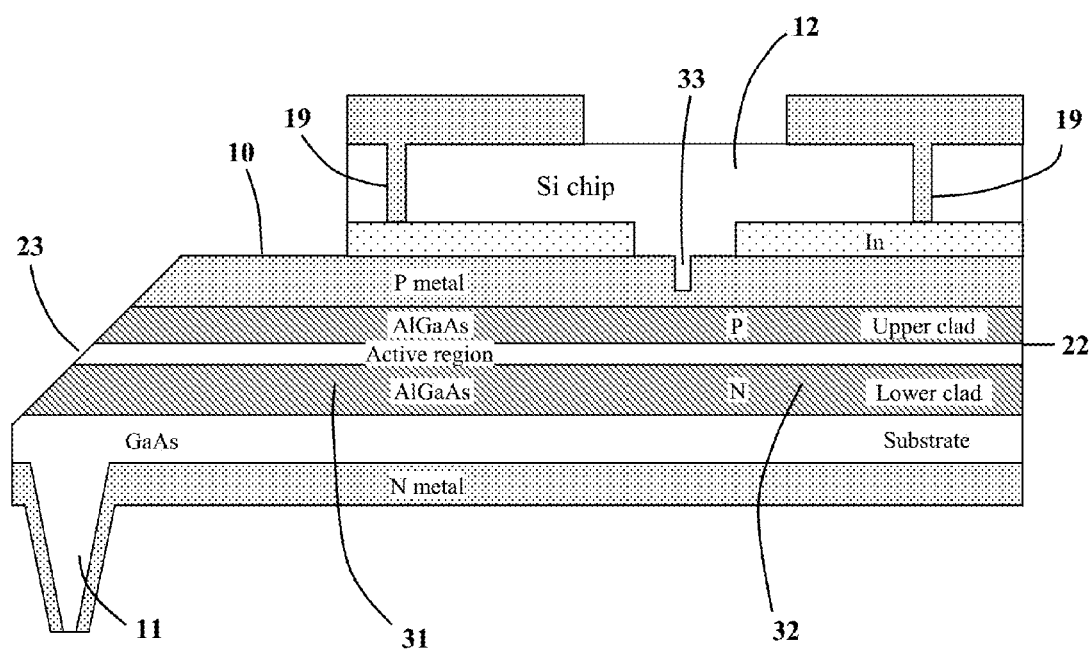
FIG. 8 is a schematic illustration of Embodiment 4 of an AFM active optical probe according to the invention.

Combining AFM probe with ultrafast pulsed near-field light source allows one to simultaneously achieve single-molecule spatial resolution and subpicosecond time resolution for ultrafast spectroscopy. The most convenient way to achieve ultrafast laser pulse generation is to employ passive mode locking technique by dividing the laser cavity into two sections—a longer gain section 31 and a shorter saturable absorber section 32 (FIG. 8). The gain section is forward biased, while the saturable absorber section is reversed biased. Electrical isolation between these two sections is achieved by using shallow dry etching to remove the heavily doped cap layer in the gap region 33.

The first laser mirror 22, mirror #1, can be fabricated by either etching the trench in the ridge waveguide below the active region down to the lower cladding layer or by cleaving the diode laser cavity. Light generated by the laser is coupled into the surface mode of the GaAs probe tip (conic-shape microprism) and transferred to the apex of the tip 11 as follows. At the end of the cantilever 10 and inside the laser cavity, mirror #2 will be fabricated by etching a 45° slanted edge that couples the light (an intracavity laser mode) vertically into the AFM tip 11 located directly underneath the 45° folding mirror 23.

Front- and back-sides of the chip are metallized in the appropriate places to make electrical contact to laser/detector structure (separate contacts for the gain and absorber section) and to provide high reflectivity for optical displacement monitoring used to read out tip deflection for AFM imaging. Electrical contact can be realized by means of holes 19 etched through the Si chip 12 and filled with metal.

Although certain embodiments of the invention have been described in detail herein, those skilled in the art will appreciate that modifications and changes can be made therein with the scope of the invention as set forth in the appended claims.

REFERENCES CITED

[An 2008] K. H. An, B. O'Connor, K. P. Pipe, Y. Zhao, and M. Shtein, "Scanning probe optical microscopy using an integrated submicron organic photodetector," in Conference on Lasers and Electro-Optics/Quantum Electronics and Laser Science Conference and Photonic Applications Systems Technologies, p. CThLL3, Optical Society of America, 2008.

[Bargiel 2006] S. Bargiel, D. Heinis, C. Gorecki, A. Grecka-Drzazga, J. A. Dziuban, and M. Jzwik, "A micromachined silicon-based probe for a scanning near-field optical microscope on-chip," *Measurement Science and Technology*, vol. 17 (#1), p. 32, 2006.

[Celebrano 2009] M. Celebrano, P. Biagioni, M. Zavelani-Rossi, D. Polli, M. Labardi, M. Allegrini, M. Finazzi, L. Du'o, and G. Cerullo, "Hollow-pyramid based scanning near-field optical microscope coupled to femtosecond pulses: A tool for nonlinear optics at the nanoscale," *Review of Scientific Instruments*, vol. 80 (#3), p. 033704, 2009.

[Codlren & Corzine 1995] L. A. Coldren and S. W. Corzine, Diode Lasers and Photonic Integrated Circuits. New York, N.Y.: John Wiley & Sons, 1995.

[Frontiera 2011] R. R. Frontiera, A. I. Henry, N. L. Gruenke, R. P. Van Duyne, "Surface-enhanced femtosecond stimulated raman spectroscopy", *J. Phys. Chem. Lett.* 2(#10), pp. 1199-1203, 2011.

[Heisig 2000a] S. Heisig, O. Rudow, and E. Oesterschulze, "Optical active gallium arsenide cantilever probes for combined scanning near-field optical microscopy and scanning force microscopy," *Journal of Vacuum Science & Technology B: Microelectronics and Nanometer Structures*, vol. 18 (#3), pp. 1134-1137, 2000.

[Heisig 2000b] S. Heisig, O. Rudow, and E. Oesterschulze, "Scanning near-field optical microscopy in the near-infrared region using light emitting cantilever probes," *Appl. Phys. Lett.*, vol. 77(#8), pp. 1071-1073, 2000.

[Hoshino 2008] K. Hoshino, L. J. Rozanski, D. A. V. Bout, and X. Zhang, "Near-field scanning optical microscopy with monolithic silicon light emitting diode on probe tip," *Appl. Phys. Lett.*, vol. 92 (#13), p. 131106, 2008.

[Hoshino 2009] K. Hoshino, A. Gopal, and X. Zhang, "Near-field scanning nanophotonic microscopy—breaking the diffraction limit using integrated nano light-emitting probe tip," *Selected Topics in Quantum Electronics, IEEE Journal of*, vol. 15 (#5), pp. 1393-1399, 2009.

[Huang 2001] X. Huang, A. Stintz, H. Li, L. F. Lester, J. Cheng, and K. J. Malloy, "Passive mode-locking in 1.3 μm two-section InAs quantum dot lasers," *Appl. Phys. Lett.* 78(#19), pp. 2825-2827, 2001.

[Kingsley 2008] J. W. Kingsley, S. K. Ray, A. M. Adawi, G. J. Leggett, and D. G. Lidzey, "Optical nanolithography using a scanning near-field probe with an integrated light source," *Appl. Phys. Lett.*, vol. 93 (#21), p. 213103, 2008.

[Klingsporn 2014] J. M. Klingsporn, M. D. Sonntag, T. Seideman, R. P. Van Duyne, "Tip-enhanced Raman spectroscopy with picosecond pulses", *J. Phys. Chem. Lett.* 5 (#1), pp. 106-110, 2014.

[Laaser 2013] J. E. Laaser, D. R. Skoff, J.-J. Ho, Y. Joo, A. L. Serrano, J. D. Steinkruger, P. Gopalan, S. H. Gellman, M. T. Zanni, "Two-dimensional sum-frequency generation reveals structure and dynamics of a surface-bound peptide", *J. Am. Chem. Soc.* 136 (#3), pp. 956-962, 2014.

[Liang 1994] E. J. Liang, A. Weippert, J. M. Funk, A. Materny, W. Kiefer, "Experimental observation of surface-enhanced coherent anti-Stokes Raman scattering", *Chem. Phys. Lett.* 227 (#1-2), pp. 115-120, 1994.

[Neacsu 2007] C. C. Neacsu, S. Berweger, and M. B. Raschke, "Tip-enhanced raman imaging and nanospectroscopy: Sensitivity, symmetry, and selection rules," *NanoBiotechnology*, vol. 3 (#3-4), pp. 172-196, 2007.

[Novotny 2011] L. Novotny and N. van Hulst, "Antennas for light," *Nature Photonics*, vol. 5, pp. 83-90, 2011.

[Partovi 1999] A. Partovi, D. Peale, M. Wuttig, C. A. Murray, G. Zydzik, L. Hopkins, K. Baldwin, W. S. Hobson, J. Wynn, J. Lopata, et al., "High-power laser light source for near-field optics and its application to high-density optical data storage," *Appl. Phys. Lett.*, vol. 75(#11), pp. 1515-1517, 1999.

[Pozzi 2014] E. A. Pozzi, M. D. Sonntag, N. Jiang, N. Chiang, T. Seideman, M. C. Hersam, R. P. Van Duyne, "Ultrahigh Vacuum Tip-Enhanced Raman Spectroscopy with Picosecond Excitation", *J. Phys. Chem. Lett.* 5 (#15), pp. 2657-2661, 2014.

[Rafailov 2007] E. U. Rafailov, M. A. Cataluna, W. Sibbett, "Mode-locked quantum-dot lasers", *Nature Photonics* 1, pp. 395-401, 2007.

[Sasaki 2000] M. Sasaki, K. Tanaka, and K. Hane, "Scanning near-field optical microscope using cantilever integrated with light emitting diode, waveguide, aperture, and photodiode," in Optical MEMS, 2000 IEEE/LEOS International Conference on, pp. 129-130, 2000.

[Vedantam 2009] S. Vedantam, H. Lee, J. Tang, J. Conway, M. Staffaroni, and E. Yablonovitch, "A plasmonic dimple lens for nanoscale focusing of light," *Nano Lett.*, vol. 9 (#10), pp. 3447-3452, 2009. PMID: 19739648.

[Xu 2012] G. Y. Xu, R. Colombelli, S. P. Khanna, A. Belarouci, X. Letartre, L. H. Li, E. H. Linfield, A. G. Davies, H. E. Beere, D. A. Ritchie, "Efficient power extraction in surface-emitting semiconductor lasers using graded photonic heterostructures", *Nature Communications*, vol. 3, Article Number 952 (2012).

[Wickramasinghe 2014] H. K. Wickramasinghe, M. Chaigneau, R. Yasukuni, G. Picardi, R. Ossikovski, "Billion-fold increase in tip-enhanced Raman signal", *ACS Nano* 8 (#4), pp. 3421-3426, 2014.

We claim:

1. An atomic force microscopy active optical probe comprising:
    a semiconductor laser source;
    an atomic force microscopy probe tip; and
    a photodetector, all monolithically integrated into a single semiconductor chip to enable both conventional atomic force microscopy measurements and optical imaging and spectroscopy at the nanoscale.

2. The atomic force microscopy active optical probe of claim 1, wherein said probe further comprises a GaAs cantilever formed from epi-layers of a GaAs-based laser structure with the atomic force microscopy probe tip fabricated from a GaAs substrate of the same GaAs-based laser structure at the end of the cantilever, and the cantilever with the tip are mounted on a conventional Si chip.

3. The atomic force microscopy active optical probe of claim 2, wherein the semiconductor laser source is defined by fabricating two mirrors, mirror #1 and mirror #2, out of the epi-layers of the GaAs-based laser structure.

4. The atomic force microscopy active optical probe of claim 3, wherein mirror #1 is a standard first-order distributed Bragg reflector grating and mirror #2 is a second-order distributed Bragg reflector grating that serves as a folding mirror to couple a laser light vertically into the atomic force microscopy probe tip.

5. The atomic force microscopy active optical probe of claim 4, wherein the probe tip has conical or pyramidal shape, and the probe tip is asymmetrically coated with metal as a result of part of the tip being left uncoated.

6. The atomic force microscopy active optical probe of claim 3, wherein mirror #1 and mirror #2 of a laser cavity are in the form of facets or edges obtained by etching or cleaving a laser wafer, or by applying focused ion beam in proper directions:
    mirror #1 is fabricated by etching or cleaving the wafer perpendicular to the epitaxial layers;
    mirror #2, a folding mirror, is fabricated by focused ion beam applied in such a way as to create a flat surface at 45° with respect to the wafer surface.

7. The atomic force microscopy active optical probe of claim 6, wherein the probe tip has conical or pyramidal shape, and the probe tip is asymmetrically coated with metal as a result of part of the tip being left uncoated.

8. The atomic force microscopy active optical probe of claim 3, wherein a semiconductor laser cavity is further divided into two sections, namely a gain section and a saturable absorber section, to provide ultrafast pulsed mode of laser operation due to passive mode locking.

9. The atomic force microscopy active optical probe of claim 8, wherein the probe tip has conical or pyramidal shape, and the probe tip is asymmetrically coated with metal as a result of part of the tip being left uncoated.

10. The atomic force microscopy active optical probe of claim 2, wherein the semiconductor laser source is a second-order distributed-feedback surface-emitting laser that employs its second-order waveguide grating to outcouple a laser light vertically into the probe tip fabricated from a laser substrate.

11. The atomic force microscopy active optical probe of claim 10, wherein the probe tip has conical or pyramidal shape, and the probe tip is asymmetrically coated with metal as a result of part of the tip being left uncoated.

12. The atomic force microscopy active optical probe of claim 10, wherein the second-order distributed-feedback surface-emitting laser is a graded second-order distributed-feedback surface-emitting laser intended for more efficient power extraction in order to increase the optical power delivered to the probe tip.

13. The atomic force microscopy active optical probe of claim 12, wherein the probe tip has conical or pyramidal shape, and the probe tip is asymmetrically coated with metal as a result of part of the tip being left uncoated.

14. The atomic force microscopy active optical probe of claim 1, wherein the optical probe is based on alternative III-V semiconductors such as InP, GaP, GaSb, and GaN to expand the available wavelength coverage from ultraviolet to visible and mid-infrared.

* * * * *